March 22, 1966 R. L. PROPST 3,241,898
HOSPITAL FURNITURE
Filed July 1, 1963 5 Sheets-Sheet 1
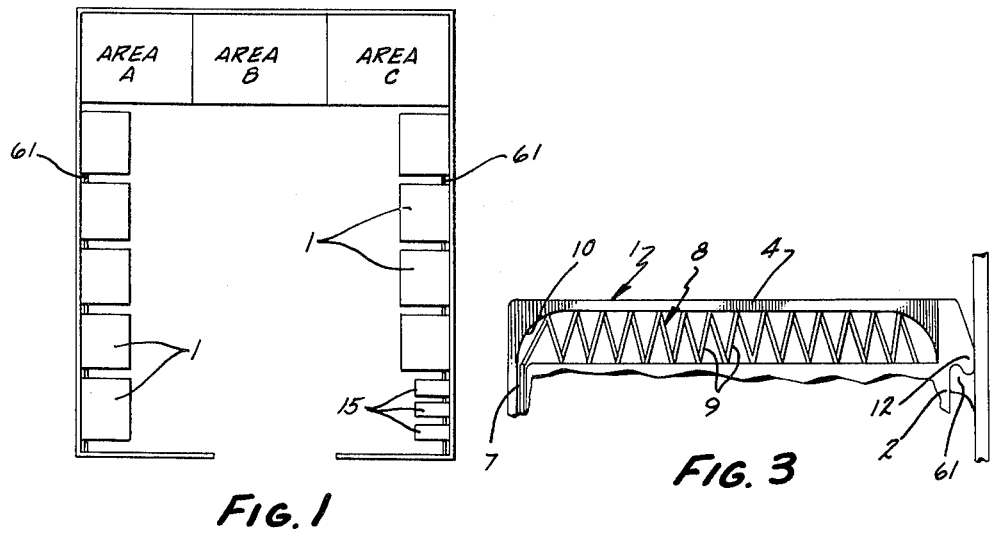
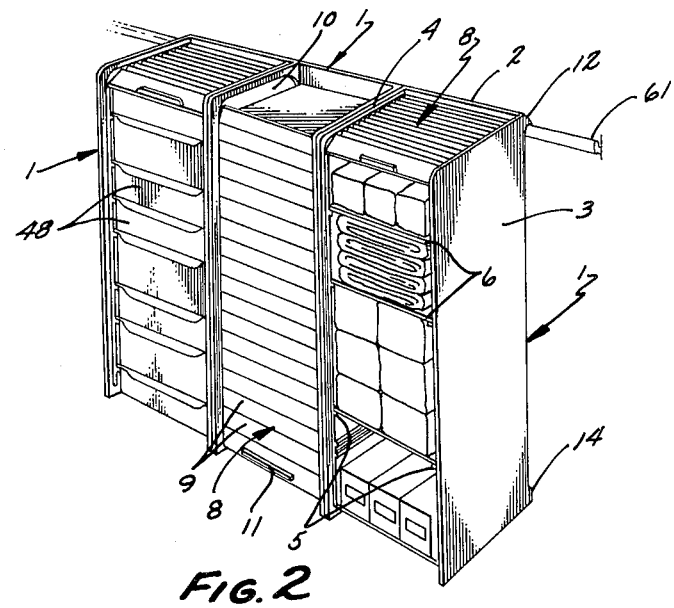
INVENTOR.
ROBERT L. PROPST
BY
ATTORNEYS March 22, 1966 R. L. PROPST 3,241,898
HOSPITAL FURNITURE
Filed July 1, 1963 5 Sheets-Sheet 2
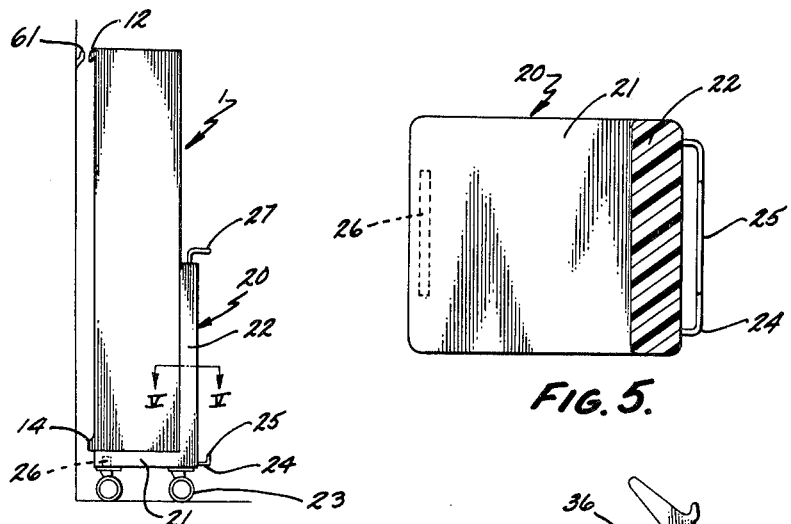
FIG. 4.
FIG. 5.
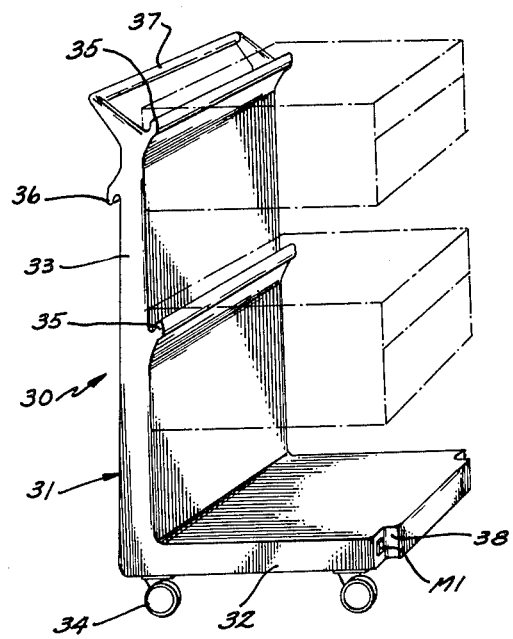
FIG. 6
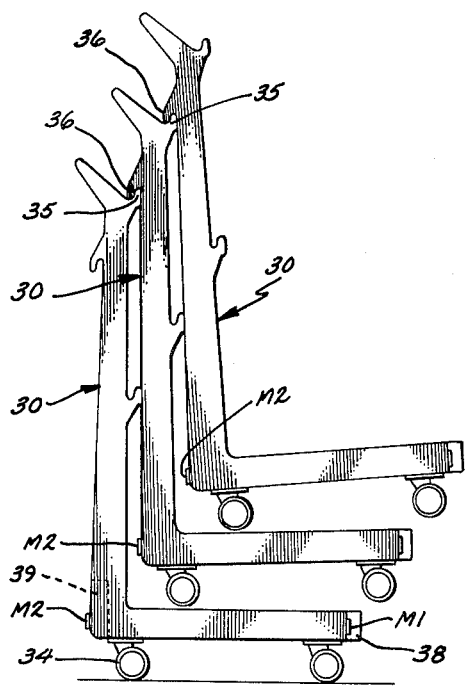
FIG. 7.
INVENTOR.
ROBERT L. PROPST
BY
*Price & Heneveld*
ATTORNEYS March 22, 1966 R. L. PROPST 3,241,898
HOSPITAL FURNITURE Filed July 1, 1963 5 Sheets-Sheet 4

INVENTOR.
ROBERT L. PROPST
BY
ATTORNEYS

March 22, 1966    R. L. PROPST    3,241,898
HOSPITAL FURNITURE

Filed July 1, 1963    5 Sheets-Sheet 5

INVENTOR.
ROBERT L. PROPST
BY
*Price & Heneveld*
ATTORNEYS

United States Patent Office 3,241,898
Patented Mar. 22, 1966

3,241,898
HOSPITAL FURNITURE
Robert L. Propst, Ann Arbor, Mich., assignor to Herman Miller, Inc., Zeeland, Mich., a corporation of Michigan
Filed July 1, 1963, Ser. No. 291,806
13 Claims. (Cl. 312—107)

This invention relates to a method of maintaining sterility within a plurality of hospital rooms. In addition, this invention relates to improved furniture construction and transporting apparatus for use in hospitals and the like. This application is related to my co-pending applications Serial Nos. 291,767, 291,822 and 291,893, filed July 1, 1963 respectively.

Hospitals at the present time are institutions facing critical and serious problems, both unique and frustrating in character. Services now expected and required from hospitals, creating additional costs, together with rising costs in general demand new and fundamental solutions. Basically, these problems have arisen because hospitals are small institutions with unusually complex functions, giving many services, each of which demand constant improvement. As the services improve, the hospitals are faced with both accelerating costs and critical obsolescence situations. If considered collectively, hospitals constitute a major industry. However, individually, hospitals cannot attack their operational problems with organized research efforts. Hospitals have remained a plurality of local institutions lacking the size, research facilities and initiative necessary to effectively develop over-all systems solutions.

Outside industry has considered the hospital as a market place for specialties, frequently proposing products developed basically for other markets, making only minor revisions to acquire a "hospital look," the products really being neither developed nor adapted specifically to handle the hospitals' increasing problems. As for new product proposals, each one requires investment, space and implementation and is concerned only with its own individual merits. Consequently, over all-progress in hospital equipment and products is actually being stymied because of "unrelated improvement," the complexities of the over-all situation only increasing with change in individual products and materials. It is an object of this invention to provide a method and system which assumes broad operational responsibility and is intended to reverse the accelerating rise in the cost of patient services and patient care in hospitals, together with reducing the ever increasing problems of complexity of operation and equipment obsolescence with which hospitals have admittedly failed to cope.

The basic object of the method and system taught herein is to provide improved care to the patient at an actual reduction in cost. Broadly, this is accomplished first through the reduction of wasteful conflict amongst the various areas of the hospital through the introduction of a completely new method of operation and secondly in the provision of improved structural equipment especially adapted to be incorporated in the method of operation set forth.

The method to be described aims primarily at solving the basic problems hospitals encounter with respect to sanitation. Although sanitary procedures and controls have been greatly improved in hospitals, hospitals now find themselves over-compensating in certain sanitation procedures to balance the absolutely unsanitizable character of a large percentage of basic hospital structures. Obviously, most furniture, transporting devices, containers and storage units of conventional design larger than pans and the like simply cannot be completely sterilized. Present methods of fabrication of traditional structures cannot even produce a structure that can be sanitized and sterilized by reasonable and routine procedures. The key to sanitation is uniform accessibility of all surfaces to mass cleaning techniques. This necessitates that all surfaces, without exception, must be clearly accessible for removal of contaminated materials. In other words, this means no seams, no cracks, no interior sharp corners, no bolt heads, no small grooves, no hinges and the like. Hospital structures are not fabricated in such a manner and no real attempt is made at sanitizing such structures. Rather, unreasonable care is given to selected items, usually fabricated of stainless steel and requiring almost a "toothbrush" attack to assure sterility. Thus, with respect to most hospital structures, even the most carefully indoctrinated and equipped personnel cannot implement reliable sanitation because of the inherent fabrication of the structures.

The second major problem combatted by the teachings of the present application relates to obsolescence and failure control with respect to hospital structures. Due to the greatly accelerated rate of change in all areas of both society and technology, these factors have now assumed tremendous importance. In the past, equipment was purchased with strong consideration given to the many years it would serve the hospital. Today, equipment is likely to be functionally obsolete in less than five years. Hospitals thus find themselves saddled with plant facilities and equipment with a long life use remaining, the equipment and plant facilities however being obsoleted by new practices and procedures. An additional disadvantage exists with respect to long term obsoleted equipment in that there is usually a long term period of "gray life" failure. By this expression, I mean the period beginning when any piece of equipment or part of the plant facility has failed either in appearance or function. It is the point at which the users no longer "like" or "trust" it but, due to replacement costs, years must be spent with it before disposal. The method and apparatus of this invention radically differs from these current attitudes toward hospital systems and products.

A further object of this invention is the provision of customized patient service. As medical treatments become more complex and sophisticated, the tendency to lump all patients into general types of care and services becomes less and less valid. It has been found that patients have radically different needs and attempts to generalize with respect to equipment causes one patient to have and pay for far more than he requires and another to require and pay for far more than he actually receives. The method and apparatus of this invention enables hospitals to provide for more fluent and adaptable equipment and service functions.

A further object of this invention is an over-all improvement of transport and supply within a hospital. Basically, hospitals currently are "run and fetch" institutions. People, supplies and equipment are constantly on the move and in too many instances, there is a remarkable waste and inefficiency of energy. Presently, endless quantities of small items are transported by human carriers, traffic congestion in the halls and around elevators being a routine frustration. Ordering, packaging, transporting, dispensing and accounting of supplies in present hospital plants is not conducted in the environment of a reasonable system or with reasonable equipment. Thus, a major objective of this invention is the delivering of supplies by lightweight transports to selected stock points during periods of low traffic density.

An additional object of this invention is to improve the appearance of the hospital plant and its equipment. Hospitals are in use twenty-four hours a day, this being a level of intensity that makes then unusually susceptible to the effects of wear and attrition. It is exceptionally expensive and difficult to presently keep equipment and plant in a fresh, bright condition. On the other hand, from the patient's standpoint, worn, deteriorated and crowded surroundings have a corrosive influence. A healthy person can tolerate more imperfection than a sick person, the latter losing confidence and being depressed if his surroundings are unpleasant and doubtful with respect to function and sanitation. Such a conclusion is properly equated with wear and failure. Structures presently in existence within the hospital are in conflict with static parts of the building itself. As noted hereinbefore, each manufacturer to date has been single-mindedly interested in the survival of his own particular product. Regardless of whether the hospital plant or the equipment is better suited to the conflict, in the long run the hospital itself is the loser.

These and other objects of this invention will become apparent to those skilled in the relevant arts upon reading the following specification in conjunction with the accompanying drawings wherein:

FIG. 1 is a schematic view of a storage area within a hospital in accordance with the method of this invention;

FIG. 2 is a front perspective view of lockers suspended within the storage room;

FIG. 3 is a cross-sectional view showing the top of one of the lockers of FIG. 2, disclosing the manner in which the locker is opened;

FIG. 4 is a side view of a cart for transporting the lockers shown in FIG. 2, one such locker being positioned thereon;

FIG. 5 is a cross-sectional view of only the cart shown in FIG. 4, taken along the plane V—V of FIG. 4;

FIG. 6 is a perspective side view of a supply cart for use within a hospital;

FIG. 7 is a side view showing a plurality of the carts of FIG. 6 stacked one upon the other;

Figure 8:
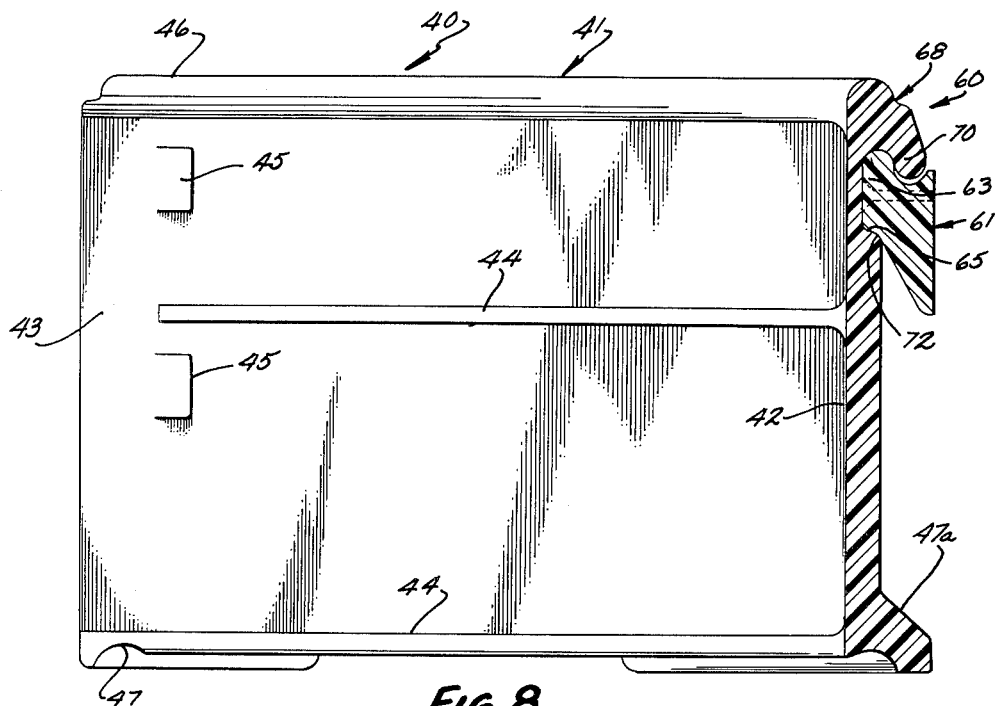
FIG. 8 is a cross-sectional view of a storage unit for use in hospitals, especially adapted to be used in association with the cart shown in FIG. 6.

Briefly, this invention relates to a method of maintaining sanitation and sterility within a plurality of hospital rooms, comprising the steps of providing units of furniture, the units of furniture fabricated of a material resistant to high temperature steam. A storage area is provided for storage of a plurality of such units. Individual rooms within the hospital are supplied with the units from the storage area upon admission of a patient therein. Contaminated units are removed from the room and steam cleansed in a special area. Sanitized units of furniture are replaced in the room from the storage area and the units of furniture are returned to the storage area from the sanitizing area.

In the perfecting of the method disclosed herein, unique equipment has been provided, this equipment comprising other aspects of this invention. First of all, a supply cart is provided having an L-shaped frame, the frame including a horizontal leg forming a plane horizontal surface and a vertical leg forming a plane vertical surface. This frame is supported on wheels associated with its horizontal leg. A rail means extends horizontally across the surface of the vertical leg proximate its top. The rail means lies on the same side of the vertical leg as the horizontal leg. Handle means is associated with generally the top of the vertical leg. A storage unit is provided having a frame including a back and a pair of parallel sides extending forwardly therefrom. An attachment rail means extends along the back in a direction extending between the legs and lying on the surface of the back opposite from the legs. At least one support is formed in each of the legs, the supports facing one another and lying generally perpendicular to the back of the frame. A storage element is removably slidable in association with the supports. More specifically, an improved drawer structure, lid and door are also provided.

Additionally, an improved attachment supporting means for detachably supporting an item such as a unit of furniture on a generally plane vertical surface is provided. This structure includes a first rail means having a back adapted to be positioned against and secured to a vertical surface such as a wall. This first rail means is elongated and has a vertically extending flange spaced from its back. The first rail means includes an undercut below the vertical flange. On the item to be supported, a second rail means is provided having a back adapted to be positioned against the item and secured thereto. The second rail means is elongated and has a depending flange extending therealong and spaced from its back. The depending flange on the second rail means is spaced from its back a distance corresponding generally to the thickness of the vertically extending flange of the first rail means.

Before describing the method of this invention in detail, the various structural components, especially adapted to be used in association with the method, will be described in detail. It should be noted at the outset that a storage area is provided in the hospital as shown for example in FIG. 1, the purpose of which will be more fully explained hereinafter. Within this storage area a plurality of lockers are provided, the specific lockers forming one aspect of this invention being shown in detail in FIG. 2. The lockers are designated by the reference numeral 1 and comprise a C-shaped frame member including a bight portion or back 2 and a pair of legs or side walls 3 and 4. This unit is preferably molded from a material exhibiting resistance to high temperature steam cleansing. Certain plastics recently developed exhibit the necessary properties and characteristics, making them an ideal material for all of the units to be described herein. As a guide to the selection of material, the plastic preferably should be castable in a low pressure mold and be relatively inexpensive in cost. It must be capable of being cast into parts of varying size and complexity. It should be a tough enough material so as to be capable of resistance to most liquids and also relatively mar resistant. Preferably, it should not support combustion and preferably must withstand autoclaving temperatures of approximately 240° Fahrenheit. It should be capable of being cast in a variety of colors and textures and be capable of maintaining proper part tolerances. It must be capable of slight deflection without use of excessive pressures. It must form a smooth moisture and bacteria impervious skin and be stable in presence of common chemicals used in hospitals. It should be stain and dent resistant, low weight, capable of molding with wide wall thickness variations in the same item and have no objectionable odor and be non-allergic. Various plastic materials now available exhibit the characteristics noted and when the term is used hereinafter in this specification, a material of this general nature is referred to.

A plurality of supporting surfaces 5 are formed along the interior of the walls 3 and 4, for supporting either the shelves 6 or individual drawers 48 as shown in FIG.

2. Vertical grooves 7 are formed adjacent the front end of each wall 3 and 4, the grooves 7 receiving the door 8 which is comprised of a plurality of individual slats 9 hinged together along their edges. The door 8 is also formed of plastic and the hinges securing the slats 9 together are formed to pivot in opposite directions. At the top of each side wall 3 and 4, a reception area 10 is formed to communicate with the respective groove 7, each reception area being smoothly rounded at its top front and top rear areas. The height of each reception area is slightly less than the height of one slat as shown in FIG. 3. A handle 11 is formed on the lowermost slat 9, whereby the door 8 may be lifted upwardly. As the ends of the slats move upwardly along the grooves 7, they are guided by the shape of the indentations or reception areas 10 and being hinged, fall into place therein. As progressive slats enter the reception areas, the alternately hinged connections cause them to collapse for storage as shown in FIG. 3. To effect closing of the door, the handle 11 is merely pushed downwardly, the slats 9 following the curvature of the reception areas and exited therefrom. A self-supporting rail means 12, or rail means requiring no extra fasteners and utilizing only its own inherent structure in function, is formed at the upper portion of the back 2, enabling the locker 1 to be hung on a mating rail means 61 on the wall of the storage room. These rail means will be described in detail hereinafter. A spacing member 14 is formed at the bottom of the back 2, assuring vertical positioning of the locker when suspended on a wall.

It will now be understood that the locker thus described is completely capable of being maintained in sanitary condition. As will be described hereinafter, this structure is in fact "dishwashable" in an area provided within the hospital. Sanitation is assured because with the structure just described continuous surface parts incorporating no seams or hardware have been provided. No hinges, no unsealed interiors, no bolt heads, no screw heads, no grooves or cracks of a small nature are existent in this structure. Shelving can be simply removed and the door itself is removable by simply spreading the side walls 3 and 4 slightly apart, this being possible because of the natural resiliency of the material and structural shape, disengaging the slats from the grooves 7. Therefore, as will be shown hereinafter, this locker plays an important role in the method disclosed by this invention. In addition, the locker described may be utilized for other purposes, such as a transportable clothes closet detachably mounted on the wall of a room, the only changes necessary being shelf positioning and the like.

The lockers 1 may be transported fully supplied to the storage room from another area of the hospital, or from outside the hospital itself, by means of carts as shown in FIGS. 4 and 5. The cart 20, again preferably fabricated from plastic, is of generally L-shape, including a horizontal leg 21 forming a horizontal plane surface and a vertical leg 22 forming a vertical plane surface. Wheels 23, preferably detachable, are mounted on the bottom of the horizontal leg 22. A foot bar 24 extends from the back of the cart, the foot bar including a raised center portion 25. A recess 26 is formed on the underside of the horizontal leg 21 adjacent its front, the recess 26 being of a size to snugly accommodate the raised center portion 25 of a foot bar 24 of another cart 20. A handle 27 is associated with the top of the vertical leg 22. In transporting the lockers 1, a locker 1 is positioned on the horizontal leg 21 of a cart 20, its front being adjacent the vertical leg 22. When a plurality of carts 20 are thus loaded, by merely placing one's foot on the foot bar 24 and tipping the cart slightly rearwardly, the cart may be attached to another cart by lowering its recess 26 to envelop the raised center portion 25 of the foot bar 24 of another cart 20. Thus, a plurality of carts 20 may be locked together as a train and thus a plurality of lockers 1 may be transpoated by one person. When the destination is reached, the cart 20 is especially adapted to mount a locker 1 on the wall of a storage room as shown in FIG. 1. By proper spacing of the mating rail means 12 and 61, upon the placing of one's foot upon the foot bar 24 and tipping the cart 20 slightly rearwardly, the rail means 12 is deposited on the rail means 61, the locker 1 being mounted on the wall and the cart 20 removed from underneath it. Thus, it will be seen that the transporting of supplies in bulk to and from or within the hospital is greatly simplified by means of the locker 1 and the cart 20.

The supply cart 30 (FIGS. 6 and 7) is provided for the transporting of individual supplies from the storage room to the hospital patient rooms themselves, as will be fully described hereinafter. The cart 30 is comprised of an L-shaped frame 31, molded from a plastic as described hereinbefore, and including a horizontal leg 32 forming a plane horizontal surface and a vertical leg 33 forming a plane vertical surface. Wheels 34 are detachably secured to the bottom of the horizontal leg 32. A pair of attachment rails 35 are formed to extend horizontally across the surface of the vertical leg 33, one rail adjacent its top and the other at approximately its middle. The rail means 35 utilized in the embodiment of this invention disclosed will be described in detail hereinafter. A mating rail means 36 is formed along the back surface of the vertical leg 33 of the cart 30, positioned at a height to mate with the top rail 35 of another cart 30 for stacking and storage as shown in FIG. 7. A handle 37 is formed adjacent the top of the vertical leg 33 of the frame 31 of cart 30, the handle being of generally U-shape, the bight portion thereof lying in a horizontal position and spaced rearwardly of the plane of the vertical leg 33. Such a handle is especially well adapted to receive items such as towels and the like. A magnet M1 is mounted in the indentation 38 at each front corner of each cart 30, the carts being gangable by the inclusion of a mating magnet M2 at each rear corner of each cart, an enlarged reception area 39 receiving the front of another cart.

Figure 10:
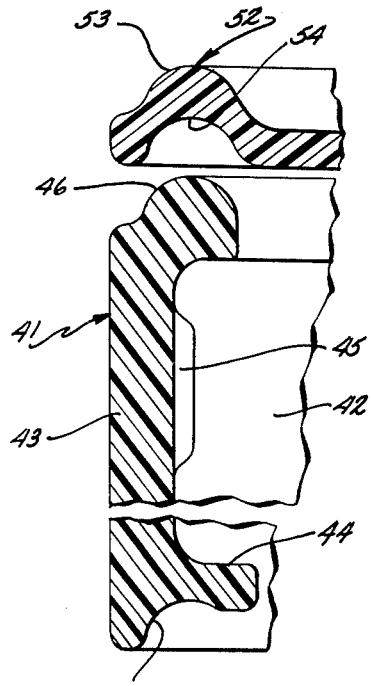
FIG. 10 is a cross-sectional view of the side of the storage unit and the lid therefor as shown in FIG. 9, showing the manner in which all parts stack one upon the other.
Figure 11:
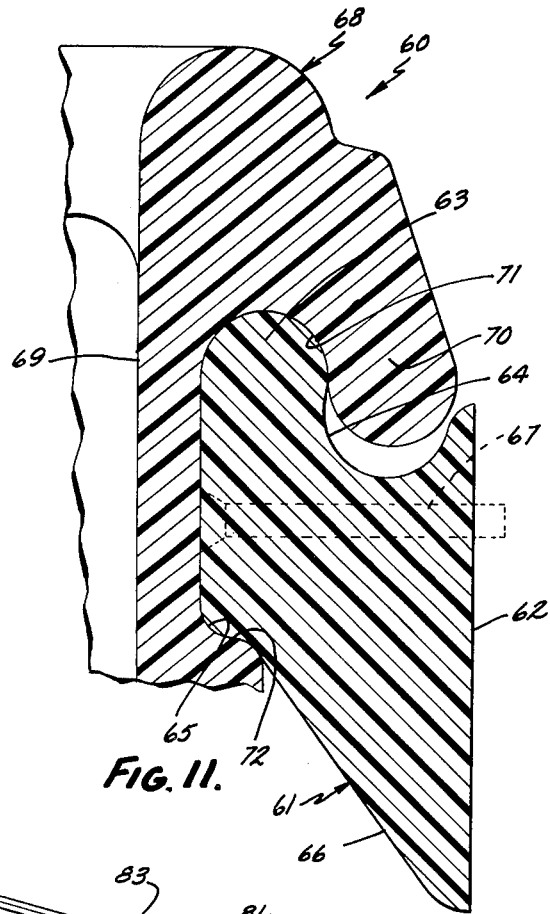
FIG. 11 is an enlarged cross-sectional view showing an attachment means used in association with the various structures disclosed herein.

A storage unit 40 (FIGS. 8–11) is adapted for use in combination with the cart 30 just described, the storage unit 40 also being adaptable for mounting on the wall of a room and the like. Before describing the storage unit itself in detail, a detailed description of the attachment rail means used in association with the various equipment disclosed herein will now be given. As best shown in FIGS. 8 and 11, this attachment supporting means is designated by the reference numeral 60 and includes a first rail means 61 having a back 62 adapted to be positioned against and secured to a vertical surface, such as the wall of a room (FIG. 1). It should be understood that the rail means 61 may actually be molded and made a part of the vertical surface, as is the case with the rails 35 on the front of the cart 30 (FIG. 6). The first rail means 61 is elongated and includes a vertically extending flange 63 spaced from the back 62 thereof. The flange 63 is convex in cross section, being circular in the embodiment shown, the curvature extending to form the depression 64 along the inward side of the flange. An undercut 65 is formed below the flange 63, the rail means terminating from the undercut 65 in a depending tail 66. If the first rail means 61 is not made an integral part of the supporting structure, bolts 67 pass through the body thereof between the flange 63 and the undercut 65.

It will be noted that the configuration of the rail means 61 provides an exceptionally strong and rigid structure when so mounted, the depending tail 66 removing considerable stress from the bolts 67 extending into the supporting surface, such as a wall. The attachment supporting means 60 includes a second rail means 68 having a back 69 adapted to be positioned against and secured to the item to be supported. Again, it should be noted that the second rail means 68 may be secured to the item or may be molded as an integral part of the item itself, as is the case with the storage units 40. The second rail means 68 is elongated and includes a depending flange 70 extending therealong, spaced from the back 69. The depending flange 70 is spaced from the back 69 a distance corresponding generally to the thickness of the vertically extending flange 63 of the first rail means 61. Again, the depending flange 70 is of convex curvature in cross section, circular in the embodiment shown, the curvature continuing to form the depression 71 on the inward side of the flange 70. A lip 72 positioned below the depending flange 70 extends outwardly a distance and is spaced to lie against the undercut 65 on the first rail means 61.

The attachment supporting means 60 operates as follows. The item is held so that the flange 70 is positioned above the flange 63 and the item is lowered, the wall or other vertical support guiding the flange 70. Automatically, the flange 70 passes over the flange 63, automatically supporting the item. When thus engaged, continued downward movement of the item by its own weight causes the lip 72 to slide under the undercut 65. It should be specifically noted that this connection is completely and totally automatic, requiring no special care by the person handling the unit to be supported. By lowering the unit over the flange 63, the flanges mate together and the lip 72 falls into position against the undercut 65. It is virtually impossible to accidentally disengage this attachment supporting means 60. In order to disengage the item, two separate and distinct movements are required. First, the item must be pulled outwardly to disengage the lip from the undercut and the item must then be lifted upwardly to disengage the flange 70 from behind the flange 63. As stated, accidental double movement of this nature is virtually impossible. However, the depressions 64 and 71 additionally aid in preventing accidental disengagement. It will be seen that if the item is swung outwardly through accidental movement too great a degree, the flanges 63 and 70 will lock in mating engagement because of the depressions 64 and 71. Thus, vertical movement of the item would not be possible as the attachment supporting means 60 would be locked. However, even though accidental disengagement is extremely difficult, it will be noted that the steps for disengagement by the user are extremely simple. With an outward movement (an extreme outward movement locking the attachment means) and then an upward movement, the item is disengaged. As will be pointed out more specifically hereinafter, this attachment means aids greatly in the usefulness of the structures described, attachment being quick, simple, automatic and positive—accidental disengagement being virtually impossible, although disengagement by the user being carried out quickly and simply. It should be noted that in the case of relatively large items, such as the locker 1, where the chances of accidental disengagement are much less, the lip 72 may be omitted from the attachment means.

Figure 9:
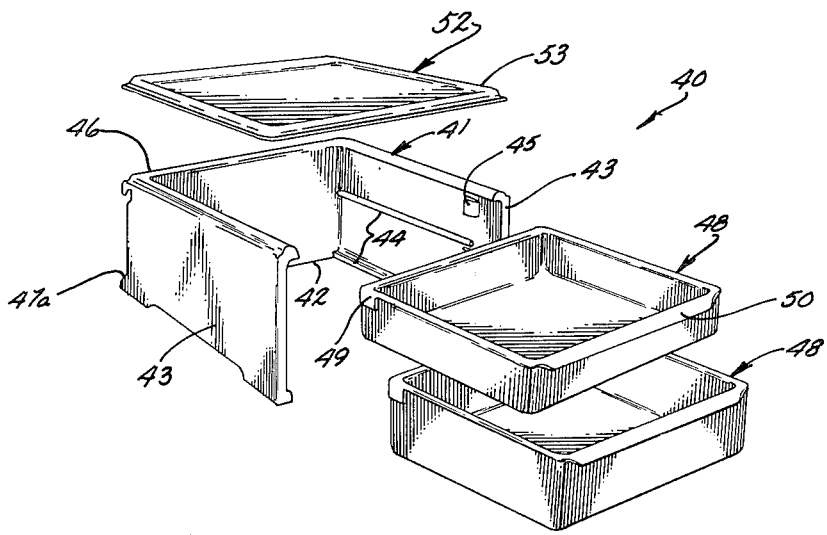
FIG. 9 is a perspective, exploded view of the storage unit shown in FIG. 8, together with a lid and drawer elements therefor.

Referring specifically to FIGS. 8 and 9, the storage unit 40 includes a frame 41 of generally C-shape including a bight portion or back 42 and a pair of parallel sides or legs 43 extending therefrom. The attachment rail means 68 is formed to extend along the back 42, extending oppositely from the legs 43. Supports 44 are formed in each of the legs 43, the supports 44 facing one another and extending generally perpendicular to the back 42 of the C-frame 41. First stops 45 are formed adjacent the ends of the legs 43, in the embodiment shown the stops being positioned above the supports 44. As shown in FIG. 10. the top of the frame 41 is of convex curvature, designated by the reference numeral 46, the bottom 47 of the frame also being formed to a convex curvature corresponding to the curvature 46. With this structure, the storage units 41 may be stacked one upon the other in a stable, secure position. A spacing member 47a is formed along the back of the C-frame to assure level positioning thereof when suspended from a vertical surface. The C-frame described is especially adapted to be molded from a plastic material as described hereinbefore.

Further, the structure is completely susceptible to autoclaving, there being no cracks, bolt heads, hinges and the like to interfere with this greatly simplified means of sterilization.

Elements 48, being drawers of different size in the embodiment shown, are adapted to be removably positioned within the C-frame 41. Again, the elements 48 are molded from a plastic material as described hereinbefore. Each element includes a stop 49 formed adjacent the top rear portion of each of its sides and a grip 50 at the front thereof. The lid 52 is also formed of a plastic material as described, the lid 52 including an elongated bead 53 of convex curvature formed along the top edge thereof. A channel 54, having a curvature corresponding to the curvature of the bead 53, is formed along the bottom edge of the lid. It will be specifically noted that in order to attain the curvatures shown and described at the top and bottom of the lid, it is necessary to mold the lid to varying thicknesses in this area. When thus formed, a plurality of lids 52 may be stacked one upon the other, the stacking being neat, secure and space saving. From an examination of FIG. 10, it will be undertsood that a plurality of lids, or a plurality of C-frames, or a plurality of loaded frames with lids thereon—or any combination thereof may be stacked one upon another in this manner. The lids 52 may simply be placed on top of the C-frames 41, being automatically positioned and remaining in place. The drawers or elements 48 (FIG. 9) may be simply inserted between the legs or walls 43 of the C-frame 41, the bottoms of the elements resting on the supports 44. The stops 49 on the elements 48 must be slipped past the stops 45 on the side walls of the C-frame 41 and this is accomplished by turning or twisting the drawers to the side when inserting them into the frame, allowing the stops on one side thereof to pass one another before the stops on the other side pass one another. Further, when molded of the material described to the configuration described, the C-frame exhibits slight flexibility, allowing the walls to spread slightly apart under pressure.

Once the drawers are inserted into the C-frame, they may be pulled in and out without being accidentally disengaged from the C-frame. This is because the stops 49 on the drawers 48 will normally engage the stops 45 on the side walls of the C-frame 41. However, when one desires to remove the drawers from the C-frame, a side twisting motion is again applied, spreading the side walls of the C-frame slightly and allowing the stop on one side of the drawer to pass the stop on the respective side wall of the C-frame. Then, the drawer may be simply pulled from the C-frame. This storage unit, including the C-frame, lid and elements or drawers is again completely susceptible to sterilization when being placed in an autoclaving unit. There are no hinges, bolts, cracks and the like which can escape the steam "dishwashing" treatment. The storage unit 40 may be easily and completely assembled and disassembled without the use of hinges, connections, screws and the like. Its appearance is neat and its cost is relatively inexpensive when compared with conventional hospital storage units. The manner in which this structure is incorporated in the process disclosed in this invention will be set forth hereinafter.

Figure 12:
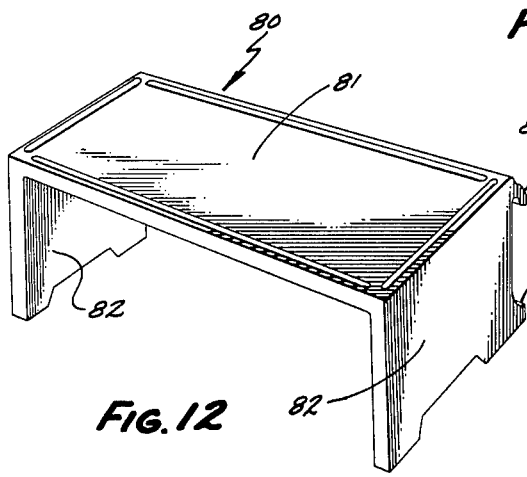
FIG. 12 is a perspective view of a shelf unit.
Figure 13:
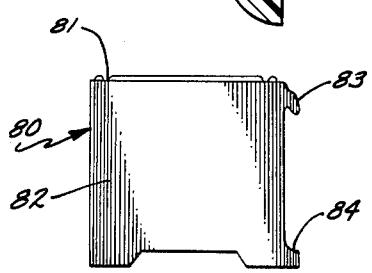
FIG. 13 is a side view of the shelf unit shown in FIG. 12.

Before turning to a detailed description of the method of this invention, additional units of furniture for use in a hospital will be described. A shelf 80 is shown in FIG. 12, again molded of plastic material as described and formed to generally a C-shape, including a supporting surface or bight portion 81 and a pair of depending legs 82. A rail means 83 is formed along one edge of the bight portion 81 extending between the legs 82, the rail means being similar to the second rail means 68 described hereinbefore. A spacing member 84 is formed below the rail means 83 on each of the legs 82, to assure that the supporting surface 81 is horizontally positioned when the shelf 80 is supported from a vertical surface by the rail means 83. It will thus be noted that a supporting surface or shelf has been provided which is exceptionally rigid in construction, the depending legs enabling it to easily support heavy weights such as a television set or the like. Again, the structure is completely capable of being "dishwashed," or of being sterilized in an autoclaving unit due to an absence of bolts and the like. Further, this unit is well adapted to double as a tray for a patient, the depending legs positioning the supporting surface over the lower part of a patient's body, the patient in a sitting position then being able to utilize the unit 80 in the manner of a bed tray.

From the teachings of this application relating to molded units of furniture especially adapted for hospital use, it will now be understood that certain other units may be fabricated for incorporation into the method to be described. Small drug dispensing units 15 may be hung in the storage area as schematically shown in FIG. 1. Thermal units (not shown) may be mountable on the supply cart described for bathing patients. Room dividers incorporating the rail means described are very practical. Such items incorporating the teachings herein disclosed may all be incorporated into the method of this invention.

Figure 14:
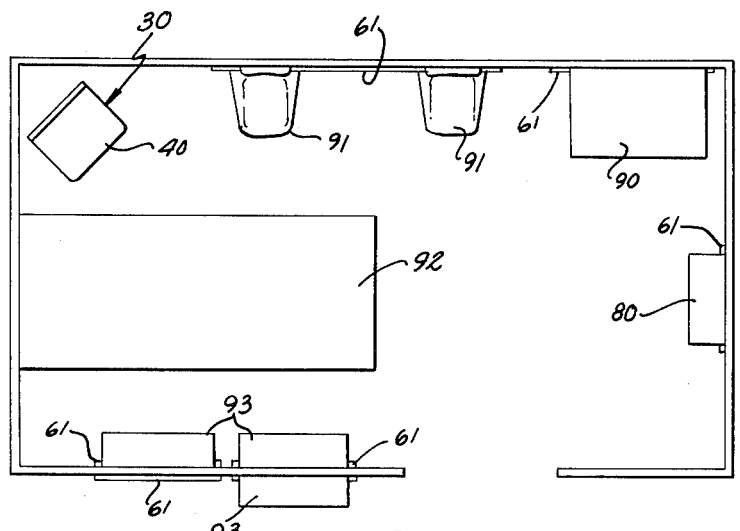
FIG. 14 is a partially schematic view of a hospital room furnished according to the teachings of this invention.
Figure 15:
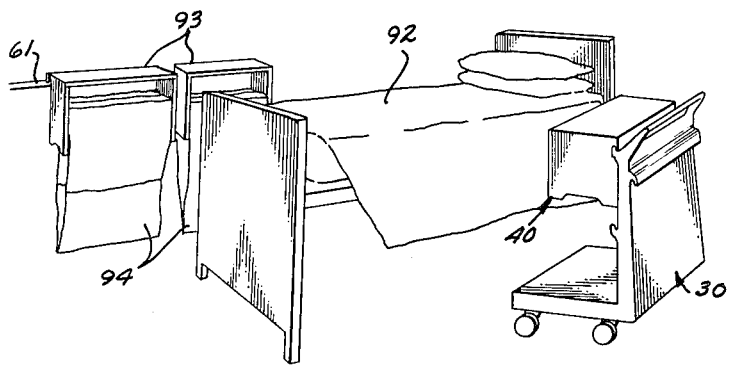
FIG. 15 is a perspective view looking toward the left-hand end of the room shown in FIG. 14.

A typical hospital room embodying the principles of this invention is shown in FIG. 14. Rail means 61 as described hereinbefore are mounted in selected positions on the walls of the hospital room as shown, additional rail means being mounted just outside the entrance to the room. A clothes closet designated by reference numeral 90 (described briefly hereinbefore) is mounted on an appropriately positioned rail means. At this point, it should be noted that if a patient is to be transferred from one room to another, the entire closet may be moved as described, saving a great deal of time and energy over conventional methods of transferring patients. Additionally, chairs may be molded as described, including appropriate rail means for hanging them on the wall as shown in FIG. 14, the chairs being designated by the reference numeral 91. A shelf 80 is mounted on a rail means within the room, ideally supporting flowers, a television set and the like. Adjacent the patient's bed 92 (of conventional structure) a transport cart 30, together with a storage unit 40, is positioned to serve the same function as conventional dressers now serve. This is shown more clearly in FIG. 15, which additionally shows a pair of C-frames and lids, designated by the reference numeral 93 mounted on the wall as described. The C-frames 93 are of generally the same construction as the storage units described hereinbefore, except that the supports therein are used to support a pair of disposable bags 94, one bag receiving waste to be destroyed, the other bag receiving items to be laundered, such as sheets and pillowcases and the like. It will now be noted that the space required within the hospital room is greatly reduced. Experiments have shown that hospital rooms presently in existence which are stuffed and crowded with conventional items suddenly become spacious and bright with the provision of the equipment described. Additionally, the only items touching the floor are the casters of the conventional bed 92 and the wheels of the cart 30—both which may be easily moved for cleaning the room. Still further, every item in the room other than the conventional bed may be quickly and simply removed for the steam cleaning or sterilization in an autoclaving area, to be more fully described hereinafter. However, it is believed that the space saving, sanitation, obsolesence and cost factors, appearance and customized service advantages are already apparent with respect to the hospital room furnished as described.

Having described the structures shown herein, the method of maintaining sterility within a plurality of hospital rooms will now be described. As noted hereinbefore, a central storage area is provided, of the general nature schematically shown in FIG. 1. Within this storage area, a plurality of supply lockers 1 are supported on rail means as described. Within these lockers, various supplies required by the area of the hospital served by this storage room for a particular period of time, such as a day, are kept. Exemplary, certain lockers might contain only linen packs, prepackaged as first day (or new patient) packs, subsequent day linen packs and towel packs. Similarly, other lockers might contain other items used during a routine day in hospital care, such as mattress pads, special sheets and the like, blankets, spreads, gowns, pillows, etc.—again prepacked. Other lockers might contain the many, many treatment items used in hospitals, too numerous to list and specify. Additional lockers might contain nothing but prepacked elements or drawers 48 for use in furnishing the hospital rooms as described. Another locker might contain some of each item, being a safety locker. An additional locker could contain only items necessary but seldom used, e.g. spinal tap trays, isolation items and the like.

Exemplary, certain of the drawers might be prepacked with personal items such as an ash tray, toothbrush, comb, paper napkins and towels and the like. Other drawers might be prepacked with standard items such as a wash basin, soap, specimen container, oral hygiene cup and the like. Additional drawers might be prepacked with items necessary for a particular type of patient. For example, certain types of patients will require dressing change materials. Contamination cases will require special materials for handling of the patient. Similarly, other types of patients will require other special materials.

All of these drawers are coded, their color being an excellent means for coding the contents within the drawer itself. Also within these storage rooms various areas of space may be provided for items associated with the system. For example, area A might be reserved for the storage of transport carts 20 or supply carts 30. Area B might contain a supply of C-frames 41 or 93, together with a plurality of lids therefor and perhaps some extra drawers associated therewith. Area C might contain a plurality of shelves 80 and miscellaneous items necessary to the system.

It should be noted at this point that the drawers and the lockers are packed in a separate area, in a more limited sense of the invention these drawers and lockers being packed in an area outside of the hospital itself. At certain times of the day (or other period of time used), preferably when the hospital is normally least conjested, prepacked lockers and storage units are delivered to the supply room. As has already been described hereinbefore, the lockers 1 may be moved by means of carts 20 through the hospital and into the storage room with speed and simplicity. With the various lockers packed and coded as described, including at least one safety locker, the lockers may be removed and replaced fully packed with regularity and accuracy. When the lockers are prepacked and delivered from outside of the hospital itself, a tremendous burden is removed from the hospital and a degree of accuracy and efficiency is achieved by those supplying the packed lockers not heretofore known in hospital administration. It should be noted that a plurality of store rooms as shown in FIG. 1 may be provided, for example one on each floor of the hospital.

Figure 16:
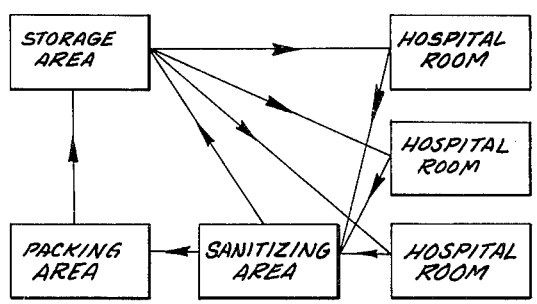
FIG. 16 is a schematic block diagram showing certain of the steps of the method comprising this invention.

Before a patient enters a hospital room, the room is prepared as follows, reference being had to FIG. 16. A laborer removes a cart 30 from the storage area, placing one storage unit thereon containing two drawers, one having personal items therein and the other having the necessary items (such as the wash basin) therein as described hereinbefore. If the patient is of a particular type requiring additional drawers, a second storage unit 40 is mounted on the cart 30 (shown in dotted lines in FIG. 6). The laborer selects a first day linen pack and other necessary items for the room, such as a shelf and the like. The rails 35 of the cart 30 are positioned such that other materials may be placed on the horizontal surface of the leg 32 of the cart. The cart 30 is then moved to the room in which the particular patient is to be admitted. She removes for destruction the bag containing destructible waste and also removes the bag containing items to be laundered. The items then in the room, such as the C-frames, the cart, the storage unit and the like are removed and taken to an area within the hospital for steam cleansing in a "dishwashing" manner. Large units of this type, capable of sanitizing large items, can practically sanitize these items because of their inherent structure as described hereinbefore. If maximum sterility is desired, the items may be autoclaved. Such autoclaving structures of a large size are well-known, comprising enclosures in which high temperature steam engages articles placed therein, thereby completely sterilizing them.

The room being thus bared, cleaning is quick and simple and sheets are placed on the bed. The room being essentially bared, it can be cleaned and sterilized in a minimum of time and with a minimum of inconvenience, the walls and floor being easily accessible. The cart containing the repacked and sterilized storage units is placed into the room, C-frames, shelves and the like being hung on the wall. Bags 94 are placed in the frames and the room is ready for occupancy. As the patient remains in the room, daily supplies and care of the patient are handled in much the same way, nurses using carts and transporting necessary materials from the storage room. It will be noted that the carts 30 are especially well adapted to be used by the nurses for transporting of thermal units for bathing the patient and the like. Additionally, if special treatment is needed, storage units may be hung on the rails outside of the door, including items such as sterilized gowns for doctors and the like. All of these items are transported from the storage room by means of the carts 30. The patient in effect thus has customized personal service.

Upon discharge, the various units of furniture described are removed from the hospital room to the sanitizing area. After being thus sanitized, certain of the units are then returned to the storage area, such as carts, C-frames and the like. Other units are removed to the packing area, whether inside or outside of the hospital, for repacking and return to the storage area as described hereinbefore. Thus, it will be seen that this method of maintaining sterility within a plurality of hospital rooms achieves a degree of sterilization within a room not heretofore known. The equipment for storing and transporting materials, together with the equipment for the room itself is radically different from structures utilized hereinbefore for patient care in hospitals. Obsolescene and failure of equipment is virtually eliminated, since the cost of the equipment involved is such that its useful life is not long enough for the materials to become obsolete. Further, these materials and equipment may be disposed of when failure does occur because their initial cost, in fact their philosophical intent, is such that this can be done. The patient is given in effect customized service and the doctors, nurses and laborers are provided with a truly functional transporting and supplying system, eliminating the "run and fetch" atmosphere presently prevailing in hospitals. Further, the appearance of the structures utilized in the method is such that the hopsital's appearance generally is greatly improved. Additional room is provided in the hopsital and congestion created by the "run and fetch" system is reduced.

It will now be further noted that the method and equipment disclosed herein provides product standardization for hospital. Thus, there is a better identification of costs, and purchasing and receiving costs are reduced. Inventory investment is likewise reduced as well as internal distribution costs. Space is saved both in central storage and in the hopsital rooms. Inventories are much better controlled and small order convenience is attained even though large order pricing is possible. Both the method and the equipment are entirely flexible to meet changing needs, both in the case of an emergency or on a long range basis. A very important advantage gained with respect to new hospital construction is the fact that capital investment is greatly reduced.

The patient also receives advantages in that better cost identification for patient billing is possible. Over-all costs are reduced in a number of ways, including space and man power savings.

It will thus be seen that the method and equipment disclosed herein provides solutions for the problems noted herein and the objectives stated have been achieved. While only certain embodiments and steps have been disclosed herein, it may be possible to practice the invention disclosed herein through the utilization of certain other steps or embodiments. Such are to be included as part of this invention unless the following claims specifically state otherwise.

I claim:

1. A storage unit for hospitals and the like, comprising: a C-shaped frame fabricated of a material exhibiting limited flexibility including a bight portion and a pair of parallel legs extending therefrom; an attachment self-supporting rail means extending along said bight portion in a direction extending between said legs and lying on the side of said bight portion opposite from said legs; at least one support in each of said legs, said supports facing one another and lying generally perpendicular to said bight portion; a first stop positioned proximate the free end of each of said legs; a storage element removably slidable in association with said supports; and a second stop positioned proximate the rear of each side of said element, whereby said element is removable from said frame by twisting movement thereof spreading said legs and allowing said second stops to pass by said first stops.

2. A storage unit for hospitals and the like, comprising: a C-shaped frame molded from a plastic material characterized by providing limited flexibility and resistance to high temperature steam including a bight portion and a pair of parallel legs extending therefrom; an attachment self-supporting rail means extending along said bight portion in a direction extending between said legs and lying on the side of said bight portion opposite from said legs; at least one support in each of said legs, said supports facing one another and lying generally perpendicular to said bight portion; a first stop positioned proximate the free end of each of said legs; a storage element removably slidable in association with said supports; and a second stop positioned proximate the rear of each side of said element, whereby said element is removable from said frame by twisting movement thereof spreading said legs and allowing said second stops to pass by said first stops.

3. A storage unit for hospitals and the like, comprising: a C-shaped frame including a bight portion and a pair of parallel legs extending therefrom; an attachment self-supporting rail means extending along said bight portion in a direction extending between said legs and lying on the side of said bight portion opposite from said legs; at least one support in each of said legs, said supports facing one another and lying generally perpendicular to said bight portion; mating stacking members positioned respectively on the top and bottom of said frame; and a storage element removably slidable in association with said supports.

4. A storage unit as defined in claim 3, said mating stacking members comprising beads of one curvature and bead receiving channels of a curvature corresponding to said one curvature.

5. A storage unit for hospitals and the like, comprising: a C-shaped frame including a bight portion and a pair of parallel legs extending therefrom; an attachment self-supporting rail means extending along said bight portion in a direction extending between said legs and lying on the side of said bight portion opposite from said legs; at least one support in each of said legs, said supports facing one another and lying generally perpendicular to said bight portion; a lid; mating stacking members positioned respectively on the top and bottom of said lid and the top and bottom of said frame; and a storage element removably slidable in association with said supports.

6. A storage unit as defined in claim 5, said mating stacking members on said lid and said frame comprising beads of one curvature and bead receiving channels of a curvature corresponding to said one curvature.

7. A storage unit as defined in claim 5, said lid and said frame molded from a plastic material characterized by resistance to high temperature steam, said mating stacking members on said lid and said frame comprising beads of one curvature and bead receiving channels of a curvature corresponding to said one curvature.

8. A storage unit for hospitals and the like, comprising: a C-shaped frame including a bight portion and a pair of parallel legs extending therefrom; an attachment self-supporting rail means extending along said bight portion in a direction extending between said legs and lying on the side of said bight portion opposite from said legs; at least one support in each of said legs, said supports facing one another and lying generally perpendicular to said bight portion; a first stop positioned proximate the free end of each of said legs; mating stacking members positioned respectively on the top and bottom of said frame; a storage element removably slidable in association with said supports; and a second stop positioned proximate the rear of each side of said element, whereby said element is removable from said frame by twisting movement thereof allowing said second stops to pass by said first stops.

9. A storage unit for hospitals and the like, comprising: a C-shaped frame molded from a plastic material characterized by providing limited flexibility and resistance to high temperature steam including a bight portion and a pair of parallel legs extending therefrom; an attachment self-supporting rail means extending along said bight portion in a direction extending between said legs and lying on the side of said bight portion opposite from said legs; at least one support in each of said legs, said supports facing one another and lying generally perpendicular to said bight portion; a first stop positioned proximate the free end of each of said legs; mating stacking members positioned respectively on the top and bottom of said frame, said mating stacking members comprising beads of one curvature and bead receiving channels of a curvature corresponding to said one curvature; a storage element removably slidable in association with said supports; and a second stop positioned proximate the rear of each side of said element, whereby said element is removable from said frame by twisting movement thereof allowing said second stops to pass by said first stops.

10. A storage unit for hospitals and the like, comprising: a C-shaped frame including a bight portion and a pair of parallel legs extending therefrom; an attachment self-supporting rail means extending along said bight portion in a direction extending between said legs and lying on the side of said bight portion opposite from said legs; at least one support in each of said legs, said supports facing one another and lying generally perpendicular to said bight portion; a first stop positioned proximate the free end of each of said legs; a lid; mating stacking members positioned respectively on the top and bottom of said lid and the top and bottom of said frame; a storage element removably slidable in association with said supports; and a second stop positioned proximate the rear of each side of said element, whereby said element is removable from said frame by twisting movement thereof allowing said second stops to pass by said first stops.

11. A storage unit for hospitals and the like, comprising: a C-shaped frame molded from a plastic material characterized by providing limited flexibility and resistance to high temperature steam including a bight portion and a pair of parallel legs extending therefrom; an attachment self-supporting rail means extending along said bight portion in a direction extending between said legs and lying on the side of said bight portion opposite from said legs; at least one support in each of said legs, said supports facing one another and lying generally perpendicular to said bight portion; a first stop positioned proximate the free end of each of said legs; a lid molded from a plastic material characterized by providing limited flexibility and resistance to high temperature steam; mating stacking members positioned respectively on the top and bottom of said lid and the top and bottom of said frame, said mating stacking members on said lid and said frame comprising beads of one curvature and bead receiving channels of a curvature corresponding to said one curvature; a storage element removably slidable in association with said supports; and a second stop positioned proximate the rear of each side of said element, whereby said element is removable from said frame by twisting movement thereof allowing said second stops to pass by said first stops.

12. A storage unit for hospitals and the like, comprising: a frame fabricated of a material exhibiting limited flexibility including a back and a pair of parallel sides; at least one support in each of said sides, said supports facing one another and lying generally perpendicular to said back; a first stop positioned proximate the edge of each side of said frame remote from said back; a storage element removably slidable in association with said supports; and a second stop positioned proximate the rear of each side of said element, whereby said element is removable from said frame by twisting movement thereof spreading said sides and allowing said second stops to pass by said first stops.

13. A storage unit for hospitals and the like, comprising: a frame molded from a plastic material characterized by providing limited flexibility and resistance to high temperature steam including a back and a pair of parallel sides; at least one support in each of said sides, said supports facing one another and lying generally perpendicular to said back; a first stop positioned proximate the edge of each side of said frame remote from said back; a storage element removably slidable in association with said supports; and a second stop positioned proximate the rear of each side of said element, whereby said element is removable from said frame by twisting movement thereof spreading said sides and allowing said second stops to pass by said first stops.

References Cited by the Examiner

UNITED STATES PATENTS

| | | | |
|---|---|---|---|
| 1,951,261 | 3/1934 | Thompson | 312—245 |
| 2,344,168 | 7/1938 | Regenhardt | 312—348 X |
| 2,202,358 | 5/1940 | Stone | 312—297 |
| 2,506,844 | 5/1950 | Smith | 312—107 |
| 2,609,024 | 9/1952 | Russ | 312—330 X |
| 2,800,380 | 7/1957 | Baker | 312—245 |
| 2,853,350 | 9/1958 | Mandel | 312—107 |
| 2,853,354 | 9/1958 | Miller et al. | 312—297 |
| 3,036,717 | 5/1962 | Johnson | 211—88 |
| 3,087,770 | 4/1963 | Gettel | 312—348 X |
| 3,107,131 | 10/1963 | Lightburn | 312—107 |

FOREIGN PATENTS

| | | |
|---|---|---|
| 415,631 | 8/1934 | Great Britain. |
| 695,913 | 8/1953 | Great Britain. |

CLAUDE A. LE ROY, *Primary Examiner.*

CHANCELLOR E. HARRIS, FRANK B. SHERRY,
*Examiners.*